(12) United States Patent
Ignaczak

(10) Patent No.: US 11,566,733 B2
(45) Date of Patent: Jan. 31, 2023

(54) JOINT ASSEMBLY, V-CLAMP, AND END FLANGES

(71) Applicant: Norma U.S. Holding LLC, Auburn Hills, MI (US)

(72) Inventor: Brian T. Ignaczak, Rochester, MI (US)

(73) Assignee: Norma U.S. Holding LLC, Auburn Hills, MI (US)

( * ) Notice: Subject to any disclaimer, the term of this patent is extended or adjusted under 35 U.S.C. 154(b) by 51 days.

(21) Appl. No.: 16/943,242

(22) Filed: Jul. 30, 2020

(65) Prior Publication Data

US 2021/0033227 A1 Feb. 4, 2021

Related U.S. Application Data

(60) Provisional application No. 62/880,905, filed on Jul. 31, 2019.

(51) Int. Cl.
*F16L 23/08* (2006.01)
*F16L 23/032* (2006.01)
*F16L 23/036* (2006.01)

(52) U.S. Cl.
CPC ............. *F16L 23/08* (2013.01); *F16L 23/032* (2013.01); *F16L 23/036* (2013.01)

(58) Field of Classification Search
CPC ....... F16L 23/036; F16L 23/032; F16L 23/08; F16L 23/04; F16L 23/20; F16L 23/10; F16L 47/14
USPC ................ 285/407, 406, 420, 364, 365, 366
See application file for complete search history.

(56) References Cited

U.S. PATENT DOCUMENTS

| | | | |
|---|---|---|---|
| 3,091,487 A * | 5/1963 | Gallagher | 285/406 |
| 3,429,014 A * | 2/1969 | Roche | F16L 23/08 |
| 3,498,649 A | 3/1970 | Pfeuffer | |
| 3,964,773 A | 6/1976 | Stade et al. | |
| 5,000,487 A * | 3/1991 | Maiville | F16L 23/08 |
| 6,164,067 A | 12/2000 | Cronjé | |
| 7,425,023 B2 * | 9/2008 | Hartig | F16L 23/08 |
| | | | 285/365 |

(Continued)

FOREIGN PATENT DOCUMENTS

| | | |
|---|---|---|
| JP | H0566393 U | 9/1993 |
| JP | 2016186314 A | 10/2016 |
| WO | WO2020011499 A1 | 1/2020 |

OTHER PUBLICATIONS

International Preliminary Report on Patentability for International Application No. PCT/US2020/044206 dated Feb. 1, 2022 (6 pages).

(Continued)

*Primary Examiner* — Zachary T Dragicevich
*Assistant Examiner* — William S. Choi
(74) *Attorney, Agent, or Firm* — Reising Ethington, P.C.

(57) ABSTRACT

A v-clamp provides an enhanced axial load to tubular body end flanges in order to establish a fluid-tight joint therebetween. The v-clamp, according to an example, has a v-angle that varies in value over a section or more of a band of the v-clamp. The varying v-angle has been shown to effect an axial load that is more evenly and uniformly applied around a circumference of the v-clamp and to the underlying tubular body end flanges. Furthermore, in an example, the tubular body end flanges have a partially spherical shape.

15 Claims, 6 Drawing Sheets

(56) References Cited

U.S. PATENT DOCUMENTS

| | | | |
|---|---|---|---|
| 7,661,730 B2* | 2/2010 | Meinig | F16L 23/04 |
| | | | 285/365 |
| 9,194,523 B2 | 11/2015 | Ignaczak et al. | |
| 9,909,698 B2 | 3/2018 | Drost et al. | |
| 10,890,284 B2 | 1/2021 | Ghirardi et al. | |
| 2006/0043734 A1* | 3/2006 | Johnson | 285/407 |
| 2006/0202480 A1 | 9/2006 | Cassel et al. | |
| 2013/0174384 A1 | 7/2013 | Ignaczak et al. | |
| 2018/0259103 A1 | 9/2018 | Ignaczak et al. | |

OTHER PUBLICATIONS

International Search Report and Written Opinion for International Application No. PCT/US2020/044206 dated Oct. 29, 2020 (10 pages).

* cited by examiner

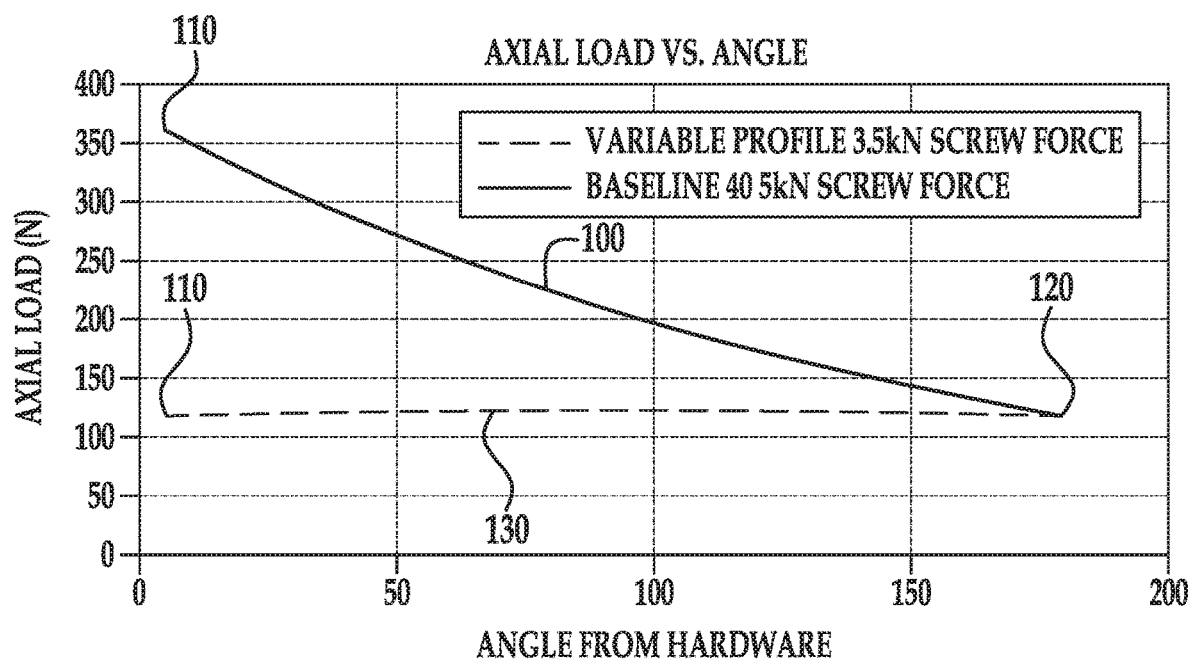
FIG. 4
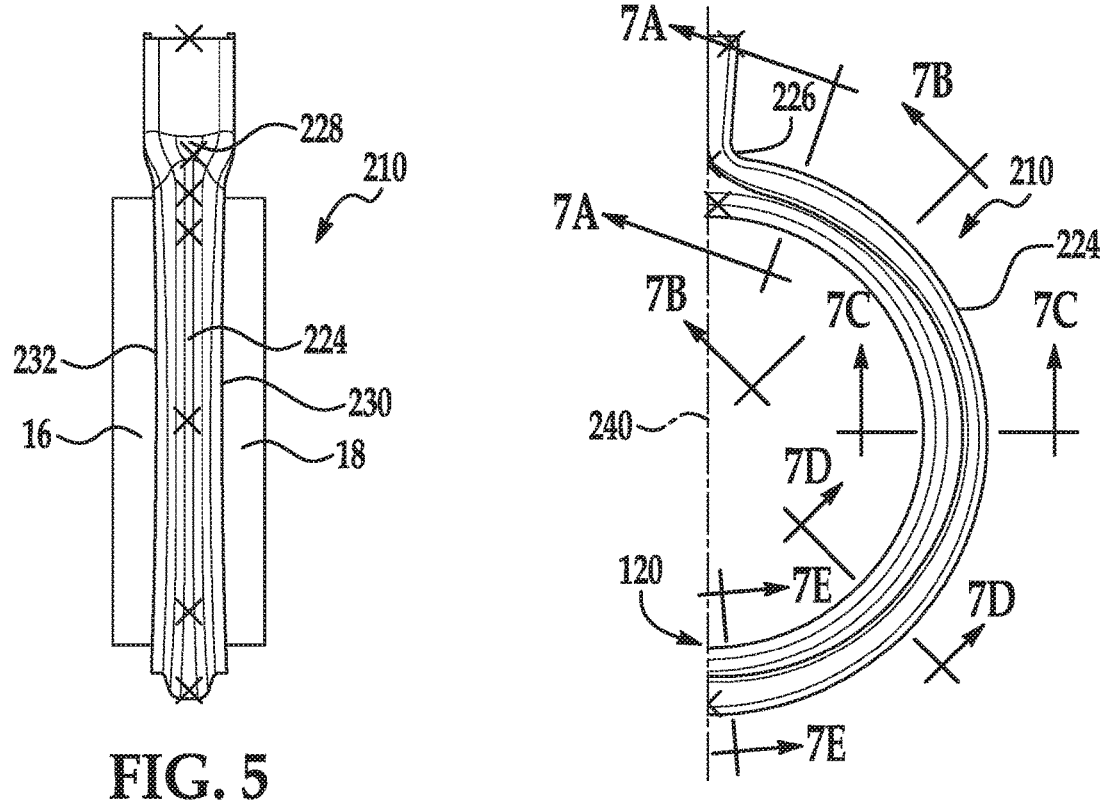
FIG. 5
FIG. 6

JOINT ASSEMBLY, V-CLAMP, AND END FLANGES

CROSS-REFERENCE TO RELATED APPLICATION

This application claims the benefit of U.S. Provisional Patent Application No. 62/880,905, filed Jul. 31, 2019.

TECHNICAL FIELD

This disclosure relates generally to v-clamps for joining tubular bodies.

BACKGROUND

V-clamps are typically used to join tubular bodies that have end flanges extending outwardly from the main structures of the tubular bodies. These types of tubular bodies are employed in a wide range of applications including, but not limited to, automotive, aerospace, agriculture, and oil and gas. Previous end flanges have angled and planar walls, and previous v-clamps have bands that exhibit a cross-sectional profile configuration that remains unchanged along the band's extent. When the v-clamps are tightened on the tubular bodies, the bands receive the end flanges and radial and axial forces exerted on the end flanges establish a fluid-tight joint at the end flanges.

SUMMARY

According to an implementation, a v-clamp may include a band. The band extends in a circumferential direction from a first end to a second end. The band has a first side wall and a second side wall. The first and second side walls establish a v-angle therebetween in sectional profile. The v-angle has a first value at a first circumferential position of the band and has a second value at a second circumferential position of the band. The first circumferential position is nearer to a closure mechanism of the v-clamp than the second circumferential position. The first value is greater than the second value.

According to another implementation, a joint assembly may include a first tubular body end flange, a second tubular body end flange, and a v-clamp. The v-clamp can be placed over the first and second tubular body end flanges. The v-clamp may include a band. The band extends in a circumferential direction from a first end to a second end. The band has a first side wall and a second side wall. The first and second side walls establish a v-angle therebetween in sectional profile. One or more of the first tubular body end flange, second tubular body end flange, and/or v-clamp has a change in shape over a portion or more of a circumferential extent thereof. The change in shape effects a generally even application of axial load to the first and second tubular body end flanges from the v-clamp over the portion or more of the circumferential extent.

According to yet another implementation, an end flange assembly may include a first tubular body end flange and a second tubular body end flange. The first tubular body end flange has a generally partially spherical shape. And the second tubular body end flange has a generally partially spherical shape.

BRIEF DESCRIPTION OF THE DRAWINGS

One or more embodiments will hereinafter be described in conjunction with the appended drawings, wherein like designations denote like elements, and wherein:

FIG. 4 is a graph presenting angle with respect to closure mechanism in degrees (°) on an x-axis, and axial load applied in Newtons (N) on a y-axis; the graph of FIG. 4 is the result of analytical modeling;

FIG. 5 is a side view of a second embodiment of a v-clamp;

FIG. 6 is a segmented front view of the v-clamp of FIG. 5;

DETAILED DESCRIPTION

With reference to FIGS. 1-3E, a first embodiment of a v-clamp 10 is presented that furnishes an improved axial load applied to a first and a second tubular body end flange 12, 14 in order to establish a fluid-tight joint therebetween. The improved axial load is more evenly and uniformly applied around a circumference of the v-clamp 10 and to the first and second tubular body end flanges 12, 14 than previously demonstrated. In this embodiment, sliding frictional effects experienced amid a tightening action are accommodated via a v-angle of the v-clamp 10 that varies in value over a section or more of the v-clamp's band, via the end flanges 12, 14 exhibiting a partially spherical profile, or a combination of both. The varied v-angle and partially spherical end flanges, when taken individually or together, provide a level of control and management—lacking in past v-clamps—over an orientation of the force ultimately applied to the underlying end flanges 12, 14. The v-clamp 10 hence converts contact forces between the v-clamp 10 and the underlying end flanges 12, 14 more efficiently and effectively than previously shown. Moreover, a tightening force needed to effect the improved force and establish the fluid-tight joint is minimized compared to past tightening forces. The v-clamp 10 is suitable for use in a wide range of applications including, but not limited to, automotive (e.g., joints adjacent a turbocharger, exhaust components, etc.), aerospace, agriculture, and oil and gas applications, and is particularly suitable in applications involving high temperatures, stringent leak requirements, and tight packaging demands.

Furthermore, as used herein, the words axially, radially, and circumferentially, and their related grammatical forms, are used in reference to the generally circular and cylindrical shape of the shown v-clamp. In this sense, axially refers to a direction that is generally along or parallel to a central axis of the circular and cylindrical shape, radially refers to a direction that is generally along or parallel to a radius of the circular and cylindrical shape, and circumferentially refers to a direction that is generally along or in a similar direction as a circumference of the circular and cylindrical shape.

Figure 1:
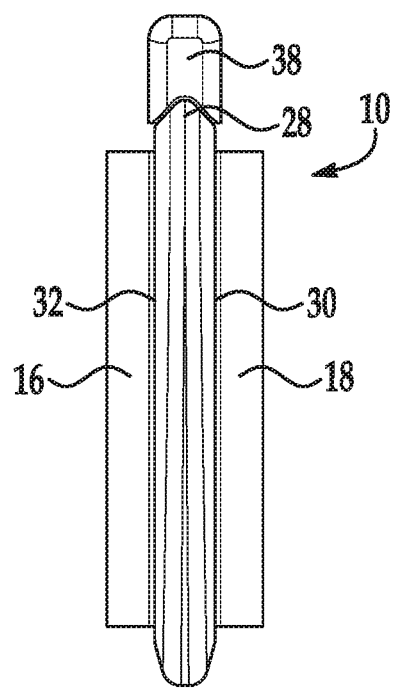
FIG. 1 is a side view of a first embodiment of a joint assembly having a pair of tubular bodies with end flanges and a v-clamp.
Figure 2:
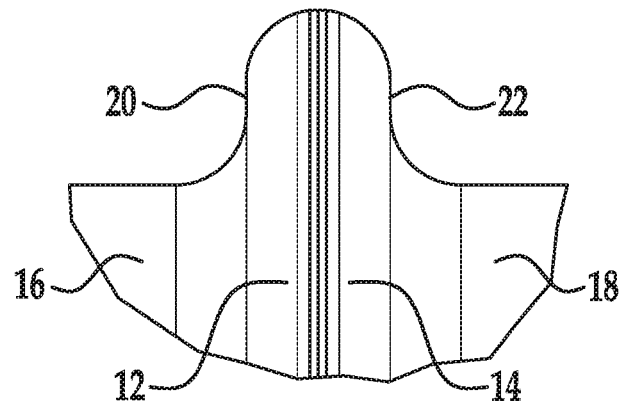
FIG. 2 is an enlarged view of the end flanges.

Turning now to FIGS. 1 and 2, the v-clamp 10 can be employed in applications involving fluid-flow through a first tubular body 16 and a second tubular body 18. The first tubular body 16 has the first end flange 12, and the second tubular body 18 has the second end flange 14. The first and second end flanges 12, 14 can be unitary extensions of their respective tubular bodies, or can be initially discrete components that are subsequently fixed to the tubular bodies. The first and second end flanges 12, 14 span circumferentially around the respective first and second tubular bodies 16, 18, and span radially outboard of the respective tubular body 16, 18. In assembly and installation, the first and second end flanges 12, 14 come together for abutment and could have a gasket seated therebetween. In the example of the gasket, one or both of the end flanges 12, 14 could have a circumferential channel residing in a confronting face 15 (FIG. 3B) thereof in which the gasket would be seated; the gasket would establish a seal against potential leakage at the surface-to-surface confrontation of the first and second end flanges 12, 14.

Figure 8:
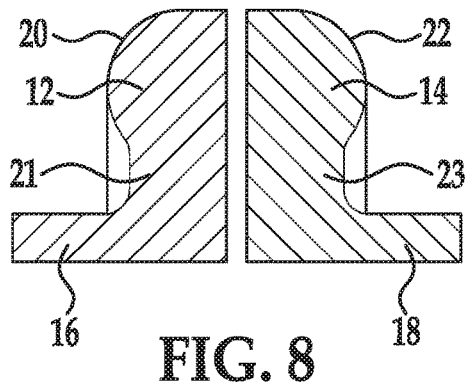
FIG. 8 is a sectional view of an embodiment of partially spherical end flanges.
Figure 9:
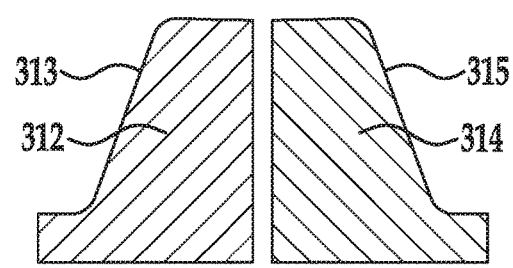
FIG. 9 is a sectional view of end flanges with planar walls.

The first and second end flanges 12, 14 can have different configurations in different embodiments. In the embodiment of FIGS. 1-3E and 8, the first and second end flange 12, 14 have a configuration that accounts for a v-angle that varies and an accompanying contact angle between the v-clamp's band and the end flanges 12, 14 that correspondingly varies; in this regard, the configuration of the end flanges can differ according to differing v-angles in other embodiments. With particular reference to FIGS. 2 and 8, here, the first end flange 12 has a generally partially spherical shape. An exterior surface 20 of the first end flange 12 is correspondingly partially circular in shape, and lacks the angled and planar surfaces of previous end flanges. A sectional profile of the first end flange 12 of FIG. 2 is depicted in FIGS. 3A-3E and demonstrates a partially spherical profile of the first end flange 12. Similarly, the second end flange 14 has a generally partially spherical shape. An exterior surface 22 of the second end flange 14 is correspondingly partially circular in shape, and lacks the angled and planar surfaces of previous end flanges. As before, the sectional profile of the second end flange 14 demonstrates a partially spherical profile of the second end flange 14. The sectional profiles of the first and second end flanges 12, 14, presented in FIG. 8 is similar to those presented in FIG. 2, but have somewhat planar base portions 21, 23 transitioning from the first and second tubular bodies 16, 18 to their partially spherical portions; their partially spherical portions provide similar effects to those of FIG. 2. Moreover, other embodiments of flanges could have partially spherical portions only at the locations of the flanges that are engaged by the v-clamp. Still, in other embodiments that lack specific depiction in the figures, the end flanges could exhibit other configurations, as set forth below. In certain embodiments, the first and second end flanges could have angled and planar walls. This is depicted in FIG. 9. First and second end flanges 312, 314 have first and second planar walls 313, 315. The first and second planar walls 313, 315 are angled at about forty degrees (40°) with respect to the vertical direction of FIG. 9 (i.e., the radial direction). The first and second end flanges 12, 14, together with the v-clamp 10, constitute a joint assembly.

The v-clamp 10 is set in place over and around the first and second end flanges 12, 14 and is tightened to assist in the establishment of a fluid-tight joint therebetween. The v-clamp 10 can have various designs, constructions, and components in different embodiments; its exact design, construction, and components can be dictated in part or more by the application in which the v-clamp will be employed and the design and construction of the end flanges in which it will be tightened down upon. In the embodiment presented by FIGS. 1-3E, the v-clamp 10 includes a band 24 and a closure mechanism (not depicted). Still, in other embodiments, the v-clamp 10 could include more, less, and/or different components than those of the figures.

Figure 3:
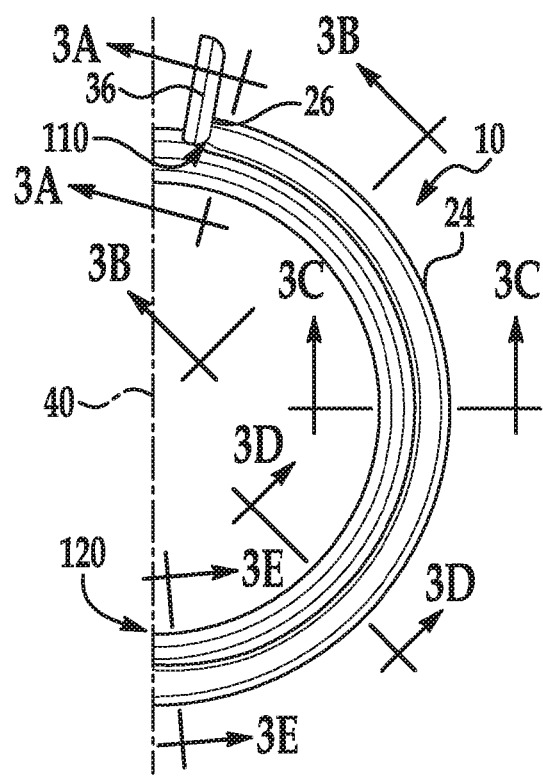
FIG. 3 is a segmented front view of the v-clamp.
Figure 3A:
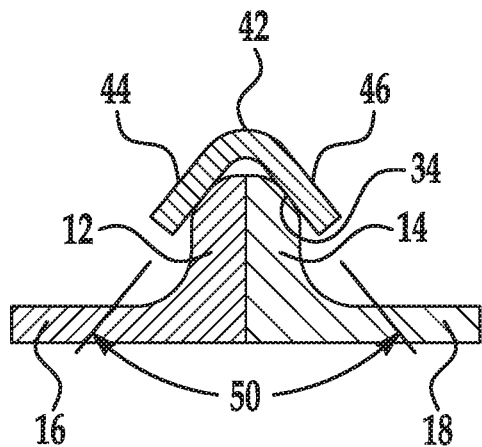
FIG. 3A is a sectional view of the v-clamp taken at arrowed line 3A-3A in FIG. 3.
Figure 3B:
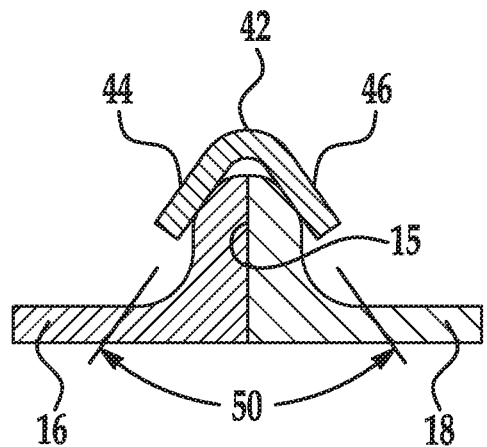
FIG. 3B is a sectional view of the v-clamp taken at arrowed line 3B-3B in FIG. 3.
Figure 3C:
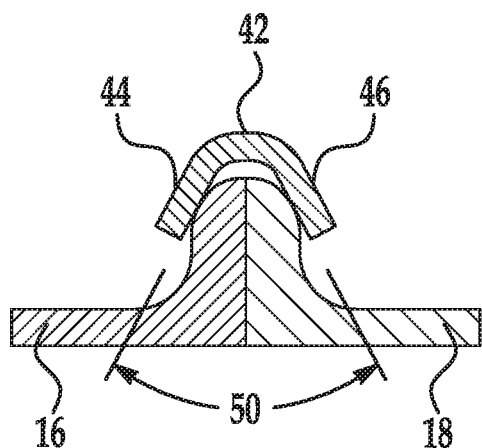
FIG. 3C is a sectional view of the v-clamp taken at arrowed line 3C-3C in FIG. 3.
Figure 3D:
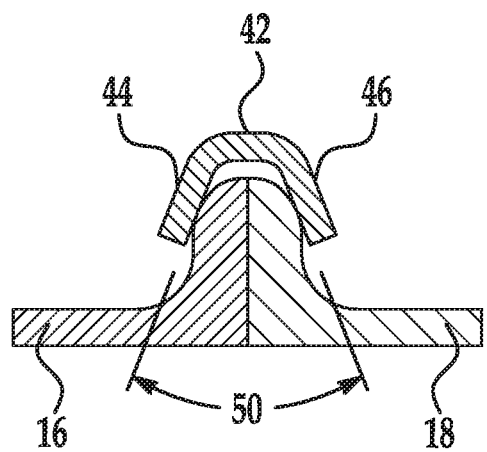
FIG. 3D is a sectional view of the v-clamp taken at arrowed line 3D-3D in FIG. 3.
Figure 3E:
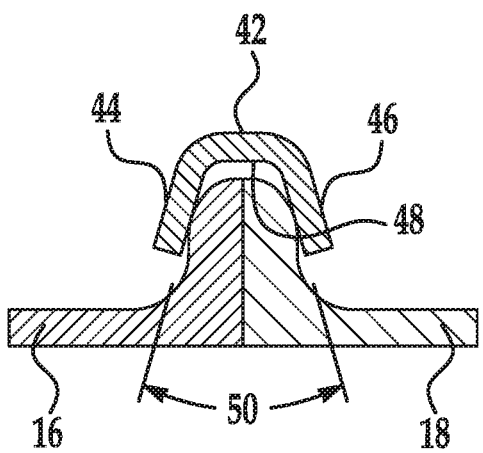
FIG. 3E is a sectional view of the v-clamp taken at arrowed line 3E-3E in FIG. 3.
Figure 7A:
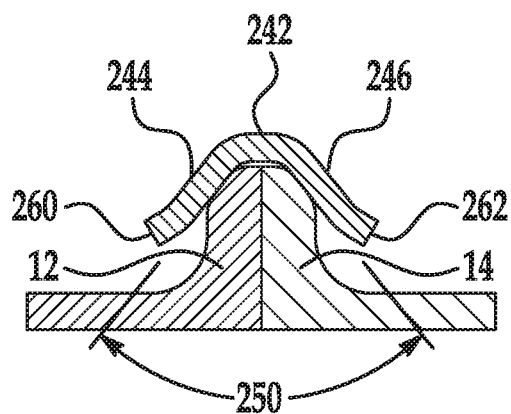
FIG. 7A is a sectional view of the v-clamp taken at arrowed line 7A-7A in FIG. 6.
Figure 7B:
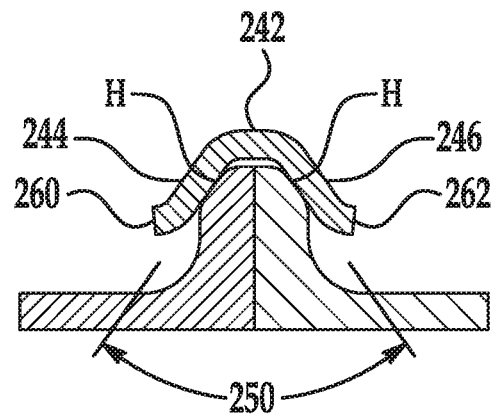
FIG. 7B is a sectional view of the v-clamp taken at arrowed line 7B-7B in FIG. 6.
Figure 7C:
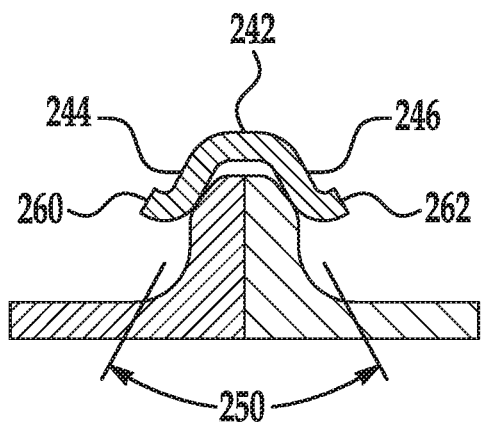
FIG. 7C is a sectional view of the v-clamp taken at arrowed line 7C-7C in FIG. 6.
Figure 7D:
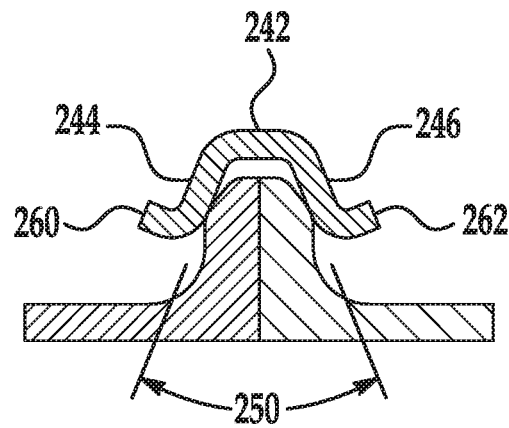
FIG. 7D is a sectional view of the v-clamp taken at arrowed line 7D-7D in FIG. 6.
Figure 7E:
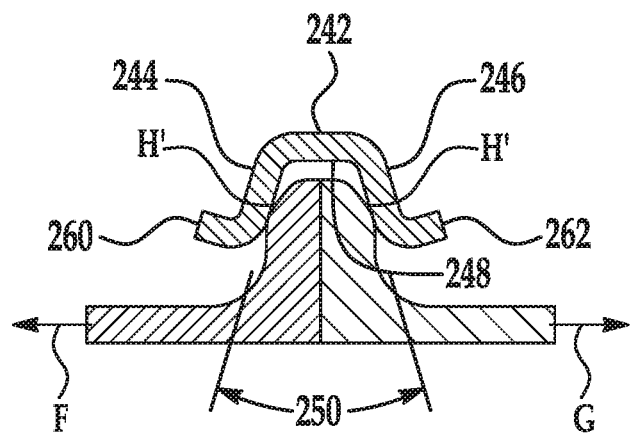
FIG. 7E is a sectional view of the v-clamp taken at arrowed line 7E-7E in FIG. 6.

The band 24 constitutes the main structure of the v-clamp 10. The band 24 can be made from a metal material such as stainless steel. The band 24 can take different forms in different embodiments. With reference to FIGS. 1 and 3, the band 24 has a first end 26 at one of its circumferential terminations, and has a second end 28 at its other and opposite circumferential termination. The band 24 can extend circumferentially continuously from the first end 26 to the second end 28, and/or can have a hinged structure or some other discontinuity in its circumferential extent between the first and second ends 26, 28. In one example, the band 24 has a pair of band segments bridged together at a circumferential position that lies 180° from the closure mechanism. At its axial boundaries, the band 24 has a first axial end 30 and a second axial end 32. On a radially-inboard facing side, the band 24 has an inner surface 34 (FIG. 3A). On the first and second ends 26, 28, the band 24 can have various formations dictated in part or more by the design and construction and components of the closure mechanism. In FIGS. 1 and 3, for example, the band 24 has first and second band flanges 36, 38 extending radially-outboard of the main circular body of the band 24. The first and second band flanges 36, 38 can each have a hole for receiving insertion of a fastener of the closure mechanism. In other embodiments, the band 24 could have first and second loops on the respective first and second ends 26, 28 that are formed by the band 24 being folded back onto itself and spot-welded in place; this type of end formation can be used with a T-bolt type tightening assembly; still, other formations are possible.

It has been found that certain past v-clamps applied an axial load to underlying end flanges in an uneven and non-uniform way. The axial load applied, testing has shown, was much higher at the tightening hardware and much lower at a location of the v-clamp's band opposite the tightening hardware. The graph of FIG. 4 evidences this somewhat poorly distributed axial load around the v-clamp's circumference. Line 100 represents a past v-clamp having a band with a cross-sectional profile configuration that remains unchanged along the extent of its band. A point 110 on the line 100 is a location of the v-clamp's band next to the tightening hardware, and a point 120, on the other hand, is a location of the v-clamp's band opposite the tightening hardware and about one-hundred-and-eighty degrees (180°) from the tightening hardware relative to the full circumference of the v-clamp's band (for demonstrative purposes, the points 110, 120 and their related locations are indicated in FIG. 3). Points on the line 100 in-between the points 110 and 120 represent respective locations along the v-clamp's band. In the graph, the axial load applied at the point 110 is greater than three-hundred-and-fifty newtons (350 N), while the axial load applied at the point 120 is below one-hundred-and-fifty newtons (150 N), evidencing a loss of more than one-half of the axial load applied from the tightening hardware to opposite the tightening hardware. And the axial load applied progressively decreases from the point 110 to the point 120. As a consequence, these past v-clamps and their established joints might be more vulnerable to leakage at locations farther away from the tightening hardware. Furthermore, it has been found that the loss of axial load is due in large part to sliding frictional effects generated amid tightening and rundown actions between the v-clamp's band and underlying end flanges. The sliding frictional effects work to dissipate band tension at increased amounts farther from the tightening hardware. The axial load that would otherwise be applied is lost through friction and the attendant reduction in band tension. To counteract the axial load losses, past tightening forces have been increased. This also often meant a larger-sized fastener and thicker band needed to withstand the increased tightening force. Skilled artisans should appreciate that the graph of FIG. 4 is the result of analytical modeling, and that similar modeling may yield differing results.

The band 24 presented by the figures has been designed and constructed to resolve the drawbacks of the past v-clamps. In this embodiment, and referring now to the sectional profiles of FIGS. 3A-3E, the band 24 has a shape that changes along a circumferential extent taken between the first and second ends 26, 28. The precise change in shape itself can differ in different embodiments. Here, the change in shape is mirrored and symmetrical about a diametric centerline 40 (FIG. 3). The band 24 has a base wall 42, a first side wall 44 extending from the base wall 42, and a second side wall 46 extending from the base wall 42. Because of the change in shape, the base wall 42 transitions from a somewhat planar configuration (FIG. 3E) at a location farthest away from the closure mechanism, to a more rounded and more pointed configuration (FIG. 3A) at a location nearest to the closure mechanism. The transitional configuration at the base wall 42 occurs gradually, as can be observed from FIGS. 3A-3E. As it transitions, the base wall 42 gradually grows in size and axially widens from the location at FIG. 3A to the location at FIG. 3E, as can be observed by a review of FIGS. 3A-3E. As but one non-limiting example, the base wall 42 can widen in size from the location at FIG. 3B to the location at FIG. 3D by approximately 1.5 millimeters (mm); in other examples, the widening can be more or less than this value. The first side wall 44 depends radially-inboard and axially-outward of the base wall 42, and likewise the second side wall 46 depends radially-inboard and axially-outward of the base wall 42. Together, the base wall 42 and first and second side walls 44, 46 establish a generally concave shape when viewed from the interior of the v-clamp 10. A channel 48 (FIG. 3E) is defined at the underside of the band 24 by the base wall 42 and first and second side walls 44, 46 and receives the first and second end flanges 12, 14 in assembly and installation.

Still referring to FIGS. 3A-3E, the change in shape of the band 24 in this embodiment is a v-angle 50 that varies along the circumferential extent of the band 24. The v-angle 50 is established between the first and second side walls 44, 46 and defined thereby. In general, the side walls 44, 46 spread apart and the v-angle 50 grows wider closer to the closure mechanism, and the side walls 44, 46 come together and the v-angle 50 grows narrower and sharper farther away from the closure mechanism. The v-angle 50 steadily and continuously increases over the band's extent from the location denoted by the point 120 in FIG. 3 and to the first end 26 and closure mechanism. Conversely, the v-angle 50 steadily and continuously decreases over the band's extent from the first end 26 and closure mechanism and to the location denoted by the point 120 in FIG. 3. For demonstrative purposes, the sectional view of FIG. 3A can constitute a first circumferential position of the band 24. The v-angle 50 at the first circumferential position in this example has a value of approximately seventy-eight degrees (78°); of course, other values of the v-angle are possible in other examples. The sectional view of FIG. 3B can constitute a second circumferential position of the band 24, and the v-angle 50 at the second circumferential position in this example has a value of approximately sixty-nine degrees (69°); of course, other values of the v-angle are possible at this circumferential position in other examples. The sectional view of FIG. 3C can constitute a third circumferential position of the band 24, and the v-angle 50 at the third circumferential position in this example has a value of approximately fifty-six degrees) (56°; of course, other values of the v-angle are possible at this circumferential position in other examples. The sectional view of FIG. 3D can constitute a fourth circumferential position of the band 24, and the v-angle 50 at the fourth circumferential position in this example has a value of approximately forty-three degrees (43°); of course, other values of the v-angle are possible at this circumferential position in other examples. Still further, the sectional view of FIG. 3E can constitute a fifth circumferential position of the band 24, and the v-angle 50 at the fifth circumferential position in this example has a value of approximately thirty-one degrees (31°); of course, other values of the v-angle are possible at this circumferential position in other examples. The precise rate-of-change of the change in shape of the band 24 can vary in different embodiments and can be dictated by the coefficient of friction experienced between the band 24 and the end flanges 12, 14 and by the tightening force of the closure mechanism.

The closure mechanism is used to tighten and loosen the v-clamp 10 and bring the first and second ends 26, 28 toward and away from each other. The closure mechanism is situated at the first and second ends 26, 28 and can be held by the first and second band flanges 36, 38. The closure mechanism can take different forms in different embodiments. In one example, the closure mechanism includes a fastener or screw and a nut. The screw is inserted through the holes in the first and second band flanges 36, 38 and the nut is threaded over the end of screw for tightening. In an example of a T-bolt type tightening assembly, the closure mechanism includes a trunnion and a fastener with a T-bolt and a nut. One example of a T-bolt type closure mechanism can be found in U.S. Pat. No. 7,441,311 owned by the applicant of this disclosure.

The varying v-angle 50 of the band 24, as described, furnishes an improved axial load that is more evenly and uniformly applied fully around the circumferential extents of the v-clamp 10 and to the first and second end flanges 12, 14. The improved axial load is the result of a force applied via clamping with radial and axial force components. The sliding frictional effects generated at locations closer to the closure mechanism, such as at the first and second circumferential positions, are decreased due to the wider v-angle thereat, resulting in a lower and more tepid dissipation in band tension thereat and hence at locations farther from the closure mechanism such as at the fourth and fifth circumferential positions. Increased band tension, it has been found, produces increased conversion to axial load. Moreover, because the v-angle 50 is sharper farther from the closure mechanism, the resulting normal force ($F_n$) exerted by the band 24 thereat is orientated and directed more in the axial direction relative to the circular shape of the v-clamp 10 than closer to the closure mechanism—this means that a greater proportion of the forces applied to the first and second end flanges 12, 14 is employed to impart axial loading. In other words, a sharper v-angle 50 has been found to exert an increased axial load.

With reference again to the graph of FIG. 4, a line 130 evidences the improved axial load. The line 130 represents a v-clamp such as the v-clamp 10 described and depicted herein with the band 24 having the varying v-angle 50. As before, the point 110 is a location of the band 24 next to the closure mechanism, and the point 120 is a location of the band 24 opposite the closure mechanism. In the graph, and unlike the line 100 of past v-clamps, the axial load applied at the point 110 is approximately the same as the axial load applied at the point 120, evidencing no measurable loss in the axial load applied from the tightening hardware to opposite the tightening hardware. And the axial load applied remains substantially steady between the points 110 and 120. The line 100 demonstrates an example of a more evenly and uniformly applied axial load and a generally even application of axial load, as described herein; still, other examples apart from the line 100 can exist. In the example presented in the graph, the axial load applied at the point 110 (e.g., a first axial load) has a value that is within about ten percent (%) of a value of the axial load applied at the point 120 (e.g., a second axial load). Satisfying this relationship, it is thought, in at least an embodiment brings about an improved axial load; still, an improved axial load can arise even absent the relationship. Moreover, because of this improved axial load of the v-clamp 10, the tightening and screw force of the closure mechanism employed to tighten the band 24 around the end flanges 12, 14 can be reduced. Indeed, in the example of FIG. 4, the tightening force used for the past v-clamp of the line 100 was approximately five Kilonewtons (5 kN), and the tightening force used for the v-clamp 10 of the line 130 was approximately three-and-one-half Kilonewtons (3.5 kN). Even with the reduced tightening force, the v-clamp 10 can furnish a suitable axial load that establishes a fluid-tight joint. By reducing the tightening force, a smaller-sized fastener of the closure mechanism and a thinner band can be used for the v-clamp 10 than would otherwise be possible. Indeed, testing has shown that the v-clamp 10 may facilitate the use of a fastener of the closure mechanism that exhibits about 30% lower strength than that of past fasteners commonly employed.

Moreover, testing was conducted in order to prove the efficacy of a v-clamp with a varying v-angle, as set forth. The testing involved v-clamps with bands of two styles: i) a band with a varying v-angle, and ii) a standard band with an invariable or constant w-angle. The band with the varying v-angle had similarities to that described with reference to FIGS. 3A-3E. The v-angle grew wider closer to its closure mechanism, and grew narrower farther away from the closure mechanism and closer to the 180° circumferential position of the band. The v-angle steadily and continuously increased over the band's extent from the 180° circumferential position and to the closure mechanism. At a circumferential position approximating that taken at FIG. 3B, the v-angle had a value of approximately 69°. Also, at this circumferential position, the band's base wall had a planar configuration with an axial width of approximately 6.43 mm. At a circumferential position approximating that taken at FIG. 3C, the v-angle had a value of approximately 56° and the band's base wall had an axial width of approximately 7.23 mm. Lastly, at a circumferential position approximating that taken at FIG. 3D, the v-angle had a value of approximately 43° and the band's base wall had an axial width of approximately 8.04 mm. Further, the band had a first foot and a second foot, described below, that remain mostly constant and unchanged in shape. The standard band with the invariable v-angle, on the other hand, had a v-angle with a value of approximately 39° and a base wall with an axial width of approximately 7.9 mm. The testing also involved end flanges of two styles: i) end flanges with a partially spherical profile, and ii) standard end flanges with planar walls angled at 40°. The end flanges with the partially spherical profile resembled that depicted in FIG. 8, and the standard end flanges with planar walls angled at 40° resembled those depicted in FIG. 9.

Figure 10:
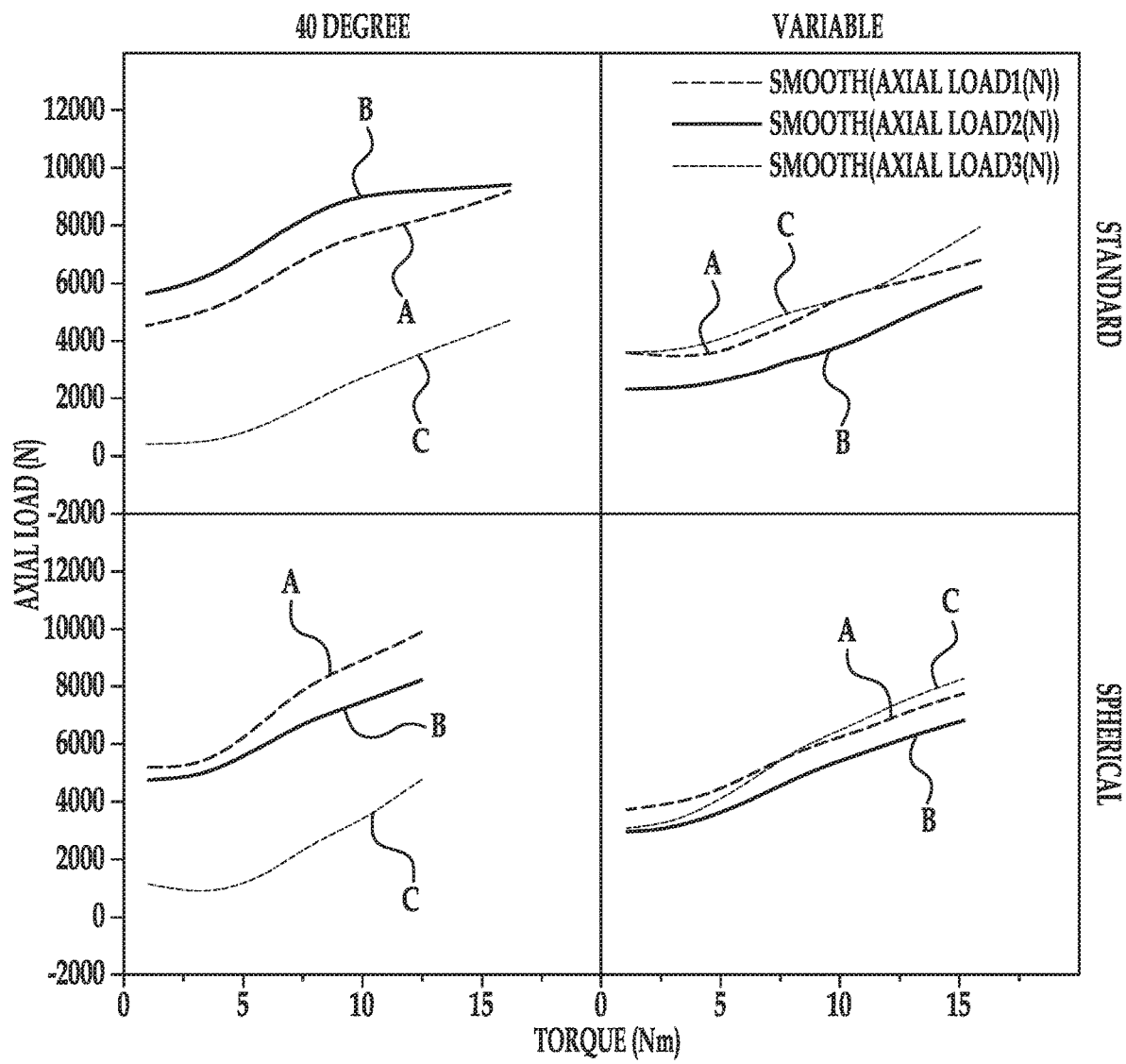
FIG. 10 are graphs presenting test results of axial load measurements versus torque applied for combinations of assemblies that include past v-clamps, past standard flanges, a v-clamp with a varying v-angle, and partially spherical end flanges.
Figure 11:
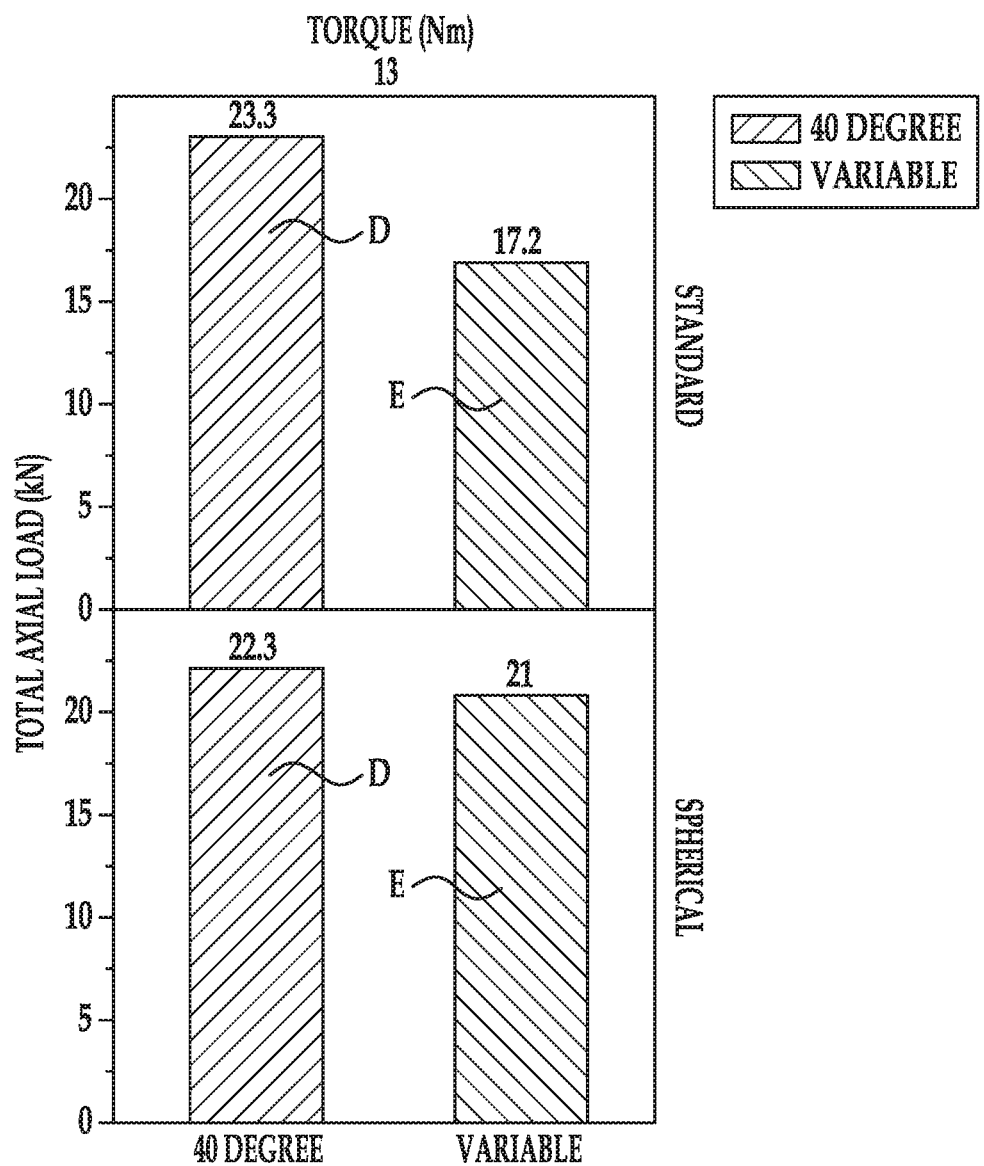
FIG. 11 is a pair of bar graphs presenting test results of total axial load measurements versus v-clamp and end flange styles by torque.

A total of four groups were tested: 1) a standard band and standard end flanges, 2) a varying v-angle band and standard end flanges, 3) a standard band and partially spherical end flanges, and 4) a varying v-angle band and partially spherical end flanges. Three samples in each of the four groups were tested. The graphs of FIG. 10 present certain testing results. Skilled artisans should appreciate that similar testing may yield differing results. Axial load in newtons (N) is plotted on the y-axis, and torque in newton-meters (Nm) is plotted on the x-axis. Testing results for group 1) are presented in the graph residing in the upper-lefthand quadrant; testing results for group 2) are presented in the graph residing in the upper-righthand quadrant; testing results for group 3) are presented in the graph residing in the lower-lefthand quadrant; and testing results for group 4) are presented in the graph residing in the lower-righthand quadrant. Dashed line A in FIG. 10 represents measurements of axial load at a circumferential position approximating that taken at FIG. 3B. Solid line B represents measurements of axial load at the circumferential position of FIG. 3B, but on an opposite side of the full v-clamp band and on the other side of the closure mechanism. And dashed line C represents axial load measurements at a circumferential position approximating that taken at FIG. 3E and that lies 180° from the closure mechanism. As can be observed from the graphs, results for groups 1) and 3) involving the standard band show a measurable and not insignificant loss in axial load among lines A and B closer to the closure mechanism, compared to line C farther from the closure mechanism. The results for groups 2) and 4), on the other hand, involving the varying v-angle band show minimal-to-no loss in axial load among lines A and B compared to line C. The bar graphs of FIG. 11 also present certain testing results. Skilled artisans should appreciate that similar testing may yield differing results. Total axial load in kilonewtons (kN) is plotted on the y-axis, and a screw force of 13 Nm of torque was applied. Testing results for group 1) are presented in the upper-lefthand bar graph D; testing results for group 2) are presented in the upper-righthand bar graph E; testing results for group 3) are presented in the lower-lefthand bar graph D; and testing results for group 4) are presented in the lower-righthand bar graph E. As can be observed from the bar graphs, there was a loss of total axial load of about 6 kN between groups 1) and 2), and there was a loss of total axial load of about 1 kN between groups 3) and 4). These losses of total axial load were deemed suitable.

With reference now to FIGS. 5-7E, a second embodiment of a v-clamp 210 is presented that, like the previous embodiment, furnishes an improved axial load applied to the first and second tubular body end flanges 12, 14. The second embodiment is similar to the first embodiment in some respects, and not all of the similarities will be repeated here in this description of the second embodiment. As before, the improved axial load provided by the v-clamp 210 is more evenly and uniformly applied around a circumference of the v-clamp 210. The first and second end flanges 12, 14 each exhibit a partially spherical profile in cross-section, as depicted in the sectional views of FIGS. 7A-7E but could have another configuration, as previously set forth, such as the angled and planar walls of FIG. 9.

The v-clamp 210 includes a band 224 and the closure mechanism as described with reference to the first embodiment. The band 224 has a base wall 242, a first side wall 244 extending from the base wall 242, and a second side wall 246 extending from the base wall 242. A channel 248 (FIG. 7E) is defined at the underside of the band 224 by the base wall 242 and first and second side walls 244, 246 and receives the first and second end flanges 12, 14 in assembly and installation. Similar to the first embodiment, the band 224 of this second embodiment has a shape that changes along a circumferential extent, and the change in shape is constituted in part by a v-angle 250 that varies over the band's circumferential extent. As before, the v-angle 250 grows wider closer to the closure mechanism and, conversely, the v-angle 250 grows narrower and sharper farther away from the closure mechanism. The v-angle 250 steadily and continuously increases over the band's extent from the location denoted by the point 120 in FIG. 6 and to the closure mechanism. Conversely, the v-angle 250 steadily and continuously decreases over the band's extent from the closure mechanism and to the location denoted by the point 120 in FIG. 6. The v-angle 250 at a first circumferential position of FIG. 7A in this example has a value of approximately seventy-seven degrees (77°). The v-angle 250 at a second circumferential position of FIG. 7B in the example has a value of approximately sixty-nine degrees (69°). Further, the v-angle 250 at a third circumferential position of FIG. 7C in the example has a value of approximately fifty-six degrees (56°), and the w-angle 250 at a fourth circumferential position of FIG. 7D in the example has a value of approximately forty-three degrees (43°). Lastly, the v-angle 250 at a fifth circumferential position of FIG. 7E in the example has a value of approximately thirty-two degrees (32°). Of course, other values of the v-angle are possible at these circumferential positions in other examples.

Dissimilar to the first embodiment, the band 224 in this second embodiment has a pair of feet residing at its first and second axial ends 230, 232 in order to augment stiffness properties of the band 224. Turning now to all of FIGS. 7A-7E, a first foot 260 spans from the first side wall 244 and constitutes a terminal extremity thereof. Indeed, the first axial end 230 of the band 224 is located at the first foot 260. Since the feet undergo a change in shape along with the band 224, as subsequently set forth, the first foot 260 depends somewhat radially-inboard of the first side wall 244 at certain locations, and depends somewhat radially-outboard of the first side wall 244 at other locations. And the first foot 260 depends somewhat axially-outward of the first side wall 244. Further, a second foot 262 spans from the second side wall 246 and constitutes a terminal extremity thereof. Indeed, the second axial end 232 of the band 224 is located at the second foot 262. Like the first foot 260, the second foot 262 depends somewhat radially-inboard of the second side wall 246 at certain locations, and depends somewhat radially-outboard of the second side wall 246 at other locations. The second foot 262 depends somewhat axially-outward of the second side wall 246.

In the second embodiment, the first and second feet 260, 262 have shapes that change along the entire circumferential extent of the band 224 between the band's first and second ends 226, 228. The precise change in shape can differ in different embodiments. Here, the change in shape is mirrored and symmetrical about a diametric centerline 240 (FIG. 6). In general, the first and second feet 260, 262 grow and become more pronounced farther away from the closure mechanism, and the feet 260, 262 recede and become less pronounced closer to the closure mechanism. With more specificity, the first and second feet 260, 262 project radially outboard to an increased degree over the band's extent from the first end 226 and closure mechanism and to the location denoted by the point 120 in FIG. 6. Also, the first and second feet 260, 262 steadily and continuously increase in length in general axially-outward directions F, G (FIG. 7E) over the band's extent from the first end 226 and closure mechanism and to the location denoted by the point 120 in FIG. 6. The axially-outward direction F is with respect to the first side wall 244, and the axially-outward direction G is with respect to the second side wall 246. These changes in shapes, as described, can be observed in part from the sectional views taken from FIG. 7A to FIG. 7E.

In this second embodiment, the more pronounced feet 260, 262 furnish greater stiffness to the band 224. For instance, the band 224 exhibits a greater stiffness at its first and second side walls 244, 246 at the circumferential position marked by the sectional view of FIG. 7E than at the circumferential position marked by the sectional view of FIG. 7B. In other words, the stiffness of the band 224 varies over the band's circumferential extent. It has been found that bending moments experienced by the band 224 at the first and second side walls 244, 246 become greater as the v-angle 250 grows narrower. The bending moment experienced at FIG. 7E, for example, is greater than that experienced at FIG. 7B. The side walls 244, 246 are urged apart (i.e., axially-outwardly) by a larger extent at circumferential positions farther away from the closure mechanism due in part to the accompanying narrowing v-angle 250. Furthermore, a moment arm established by a loading point of contact between the end flanges 12, 14 and side walls 244, 246 can be longer at circumferential positions farther away from the closure mechanism—this is demonstrated in the example by loading points H in FIG. 7B and H' in FIG. 7E. And, material stresses experienced by the band 224 at the first and second side walls 244, 246 become greater as the v-angle 250 grows narrower. As a consequence, in some cases the side walls 244, 246 can be urged apart by a larger extent than wanted farther from the closure mechanism, potentially thwarting the intended control and management over the orientation of the applied force. The feet 260, 262 and their attendant stiffness work to counteract these unwanted consequences and help maintain the intended orientation of the applied force.

As an alternative to the second embodiment, the band 224 could have the feet 260, 262 that grow and become more pronounced farther away from the closure mechanism and as presented in FIG. 6 and FIGS. 7A-7E, but the band 224 could have a v-angle 250 that does not vary over the band's circumferential extent and instead maintains a constant and unchanged angle value over the band's circumferential extent. In this alternative, the first and second end flanges 12, 14 would still each exhibit a partially spherical profile in cross-section, as previously described. Here, the control and management over the orientation of the applied force is established via the varying feet 260, 262 and the attendant varying stiffness. The band's side walls 244, 246 are urged apart and deflect in response to the tightening actions from the closure mechanism by varying amounts according to the varying stiffness. For instance, deflection can be greater at circumferential locations of the band 224 having less stiffness, and can be less at circumferential locations of the band 224 having more stiffness. Since the v-angle 250 is unchanged, having the feet 260, 262 recede and become less pronounced closer to the closure mechanism provides greater deflection of the band 224 closer to the closure mechanism. And conversely, having the feet 260, 262 grow and become more pronounced farther away from the closure mechanism provides less deflection of the band 224 farther from the closure mechanism. Accordingly, as with previous embodiments, sliding frictional effects are decreased closer to the closure mechanism, resulting in a lower and more tepid reduction in band tension at locations farther from the closure mechanism. Still, in yet another embodiment, the feet 260, 262 could reside on the band 224 with the v-angle 250 that varies over the band's circumferential extent, as described, but the feet 260, 262 could themselves lack a change in shape and instead could remain constant and unchanged in shape over the band's circumferential extent.

In a third embodiment, an improved axial load applied to the first and second tubular body end flanges 12, 14 is furnished in larger part by the end flanges themselves. The first and second tubular body end flanges 12, 14 in this embodiment each have a shape that changes over their circumferential extents, while the v-clamp's band has a w-angle that does not vary and instead maintains a constant and unchanged angle value over the band's circumferential extent. In this third embodiment, the band also lacks the changing feet of the second embodiment. Here, the control and management over the orientation of the applied force is established via the varying shape of the first and second tubular body end flanges 12, 14. In this third embodiment, instead of the first and second tubular body end flanges 12, 14 exhibiting partially spherical profiles in cross-section, in order to effect the change in shape each of the first and second tubular body end flanges 12, 14 has an exterior wall and surface that is planar like that shown in FIG. 9. The planar exterior walls and surfaces vary their orientation with respect to a center axis of the respective first and second tubular body 16, 18. As in previous embodiments, the varying orientation is mirrored and symmetrical about the diametric centerline (40, 240).

The planar exterior walls and surfaces define an acute angle with respect to the center axis of the respective first and second tubular body 16, 18. The acute angle narrows and becomes smaller closer to the closure mechanism with respect to the installation position of the v-clamp on the end flanges 12, 14 and, conversely, widens and becomes larger farther away from the closure mechanism. The acute angle steadily and continuously decreases over the flanges' extent from the location denoted by the point 120 in FIG. 6 and to the closure mechanism, again relative to the installation position of the v-clamp on the end flanges 12, 14. Conversely, the acute angle steadily and continuously increases over the flanges' extent from the closure mechanism and to the location denoted by the point 120, again relative to the installation position of the v-clamp on the end flanges 12, 14. While the v-clamp's band has an unchanged v-angle in this third embodiment prior to installation and tightening, the v-angle does indeed vary upon installation and tightening of the v-clamp due to the varying acute angle of the planar exterior walls and surfaces of the first and second tubular body end flanges 12, 14. In this embodiment, the v-angle varies in a manner that is akin to the varying v-angle of the first embodiment. The v-angle grows wider closer to the closure mechanism and, conversely, grows narrower farther away from the closure mechanism. And as before, because the acute angle is larger farther from the closure mechanism and the v-angle concomitantly sharper farther from the closure mechanism, the resulting normal force ($F_n$) exerted by the v-clamp's band thereat is oriented and directed more in the axial direction than closer to the closure mechanism. Accordingly, a greater proportion of the forces applied to the first and second end flanges 12, 14 is employed to impart axial loading.

In yet another embodiment, the band 24 has the v-angle 50 that varies along the circumferential extent of the band 24, and the tubular body end flanges 12, 14 have the planar exterior walls and surfaces that vary their orientation with respect to the center axis of the respective tubular body 16, 18. In essence, this embodiment combines and incorporates the designs and constructions of the first and third embodiments. The varying v-angle 50 and varying acute angle, as previously described, work together to furnish the improved axial load applied to the first and second tubular body end flanges 12, 14. The control and management over the orientation of the applied force is hence established via the combined varying v-angle 50 and varying acute angle of the tubular body end flanges 12, 14. Upon installation and tightening, the band's v-angle 50 grows wider closer to the closure mechanism and, conversely, grows narrower farther from the closure mechanism. As before, the resulting normal force ($F_n$) exerted by the v-clamp's band 24 is oriented and directed more in the axial direction farther from the closure mechanism than closer to the closure mechanism, and hence a greater proportion of the forces applied to the end flanges 12, 14 is employed to impart axial loading.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A v-clamp, comprising:
a band extending circumferentially from a first end to a second end, said band having a first side wall and a second side wall, said first side wall and second side wall establishing a w-angle therebetween in sectional profile;
wherein said v-angle has a first value at a first circumferential position of said band and has a second value at a second circumferential position of said band, said first circumferential position resides adjacent a closure mechanism and said second circumferential position resides at a location opposite the closure mechanism and one-hundred-and eighty degrees(180°) circumferentially from the closure mechanism, said first value being greater than said second value, and a value of said v-angle steadily increases along a circumferential extent of said band from said second circumferential position to said first circumferential position.

2. The v-clamp as set forth in claim 1, wherein said v-angle has a third value at a third circumferential position of said band, said third circumferential position being between said first circumferential position and said second circumferential position, and said third value being greater than said second value and less than said first value.

3. The v-clamp as set forth in claim 2, wherein said v-angle has a fourth value at a fourth circumferential position of said band, said fourth circumferential position being between said first circumferential position and said third circumferential position, and said fourth value being greater than said third value and less than said first value.

4. The v-clamp as set forth in claim 1, wherein a third circumferential position of said band resides adjacent the closure mechanism opposite said first circumferential position, a value of said v-angle steadily increases along a circumferential extent of said band from said second circumferential position to said third circumferential position.

5. The v-clamp as set forth in claim 1, wherein said band has a base wall, said first side wall depending from said base wall and said second side wall depending from said base wall, said base wall having a planar configuration that widens in size from said first circumferential position to said second circumferential position.

6. The v-clamp as set forth in claim 1, further comprising a first foot spanning from said first side wall and a second foot spanning from said second side wall.

7. The v-clamp as set forth in claim 6, wherein said first foot steadily increases in length in an axially-outward direction relative to said first side wall along the circumferential extent of said band from said second circumferential position to said first circumferential position, and said second foot steadily increases in length in an axially-outward direction relative to said second side wall along the circumferential extent of said band from said second circumferential position to said first circumferential position.

8. A joint assembly comprising a first tubular body end flange and a second tubular body end flange, the first tubular body end flange has a spherical shape, the second tubular body end flange has a spherical shape, the joint assembly further comprising the v-clamp of claim 1.

9. A joint assembly, comprising:
a first tubular body end flange;
a second tubular body end flange; and
a v-clamp placeable over said first and second tubular body end flanges, said v-clamp comprising a band extending circumferentially from a first end to a second end, said band having a first side wall and a second side wall, said first side wall and second side wall establishing a w-angle therebetween in sectional profile;
further comprising a first foot spanning from said first side wall and a second foot spanning from said second side wall, said first foot steadily increasing in length in an axially-outward direction relative to said first side wall along a circumferential extent of said band from a first circumferential position of said band to a second circumferential position of said band, said second foot steadily increasing in length in an axially-outward direction relative to said second side wall along the circumferential extent of said band from said first circumferential position of said band to said second circumferential position of said band, said first circumferential position resides adjacent a closure mechanism, and said second circumferential position resides at a location opposite the closure mechanism and one-hundred-and-eighty degrees(180°) circumferentially from the closure mechanism.

10. The joint assembly as set forth in claim 9, wherein said v-angle having a first value at said first circumferential position of said band and having a second value at said second circumferential position of said band, and said first value being greater than said second value.

11. The joint assembly as set forth in claim 10, wherein said v-angle continuously varies in value along a circumferential extent of said band from said first end to said second end.

12. The joint assembly as set forth in claim 10, wherein said first tubular body end flange has a spherical shape and said second tubular body end flange has a spherical shape.

13. The joint assembly as set forth in claim 9, wherein said first tubular body end flange has a first exterior surface and said second tubular body end flange has a second exterior surface, said first exterior surface has a planar portion and said second exterior surface has a planar portion, said first exterior surface having a first orientation with a first center axis of said first tubular body end flange that varies relative to the first center axis over at least the portion of the circumferential extent of said first tubular body end flange and said second exterior surface having a second orientation with a second center axis of said second tubular body end flange that varies relative to the second axis over at least the portion of the circumferential extent of said second tubular body end flange.

14. The joint assembly as set forth in claim 13, wherein a value of said v-angle continuously varies along the circumferential extent of said band from said first circumferential position to said second circumferential position.

15. The joint assembly as set forth in claim 9, wherein said first tubular body end flange has a spherical shape and said second tubular body end flange has a spherical shape.

* * * * *

UNITED STATES PATENT AND TRADEMARK OFFICE
CERTIFICATE OF CORRECTION

PATENT NO. : 11,566,733 B2
APPLICATION NO. : 16/943242
DATED : January 31, 2023
INVENTOR(S) : Brian T. Ignaczak It is certified that error appears in the above-identified patent and that said Letters Patent is hereby corrected as shown below:

In the Claims

Column 13, Line 6, replace the phrase "w-angle" with "v-angle"

Column 14, Line 9, replace the phrase "w-angle" with "v-angle"

Signed and Sealed this
Twenty-eighth Day of March, 2023

Katherine Kelly Vidal
*Director of the United States Patent and Trademark Office*